United States Patent [19]
Su et al.

[11] Patent Number: 6,136,903
[45] Date of Patent: Oct. 24, 2000

[54] REPULPABLE, PRESSURE-SENSITIVE ADHESIVE COMPOSITIONS

[75] Inventors: Shiaonung Su, Buena Park, Calif.; Paul Keller, Gottlieben; Graham Yeadon, Marbach, both of Switzerland

[73] Assignee: Avery Dennison Corporation, Pasadena, Calif.

[21] Appl. No.: 08/947,930

[22] Filed: Oct. 9, 1997

[51] Int. Cl.⁷ .......................... C09J 131/00; C09J 135/00
[52] U.S. Cl. .......................... 524/167; 524/460; 524/461; 524/804; 525/80; 525/85; 526/78; 526/79; 526/87; 526/225
[58] Field of Search ................................. 525/79, 80, 85; 526/78, 87, 225, 79; 524/167, 460, 461, 804

[56] References Cited

U.S. PATENT DOCUMENTS

| | | |
|---|---|---|
| 3,299,010 | 1/1967 | Samour . |
| 3,400,103 | 9/1968 | Samour . |
| 3,441,430 | 4/1969 | Peterson ................. 117/68.5 |
| 3,691,140 | 9/1972 | Silver . |
| 3,769,151 | 10/1973 | Knutson et al. ............. 161/204 |
| 3,865,770 | 2/1975 | Blake . |
| 3,983,297 | 9/1976 | Ono et al. ................. 428/355 |
| 4,052,368 | 10/1977 | Larson . |
| 4,110,290 | 8/1978 | Mori et al. . |
| 4,131,581 | 12/1978 | Coker . |
| 4,413,080 | 11/1983 | Blake ..................... 524/187 |
| 4,456,726 | 6/1984 | Siol ....................... 524/501 |
| 4,492,724 | 1/1985 | Allbright et al. .............. 428/40 |
| 4,495,318 | 1/1985 | Howard .................... 524/375 |
| 4,564,664 | 1/1986 | Chang ..................... 524/833 |
| 4,569,960 | 2/1986 | Blake ..................... 524/145 |
| 4,759,983 | 7/1988 | Knutson ................... 428/343 |
| 4,810,763 | 3/1989 | Mallya .................... 526/203 |
| 4,820,746 | 4/1989 | Rice ...................... 522/127 |
| 4,845,149 | 7/1989 | Frazee .................... 524/458 |
| 4,923,919 | 5/1990 | Frazee .................... 524/460 |
| 5,049,416 | 9/1991 | Wilczynski ............... 427/208.4 |
| 5,059,479 | 10/1991 | Yuyama et al. ............. 428/323 |
| 5,183,841 | 2/1993 | Bernard ................... 524/272 |
| 5,185,212 | 2/1993 | Spada et al. ............... 428/483 |
| 5,196,504 | 3/1993 | Scholz et al. ............ 526/318.4 |
| 5,221,706 | 6/1993 | Lee et al. ................. 524/156 |
| 5,252,662 | 10/1993 | Su et al. .................. 524/549 |
| 5,278,227 | 1/1994 | Bernard ................... 524/817 |
| 5,316,621 | 5/1994 | Kitao et al. ................. 164/4 |
| 5,326,644 | 7/1994 | Scholz et al. .............. 428/514 |
| 5,415,739 | 5/1995 | Furman, Jr. et al. .......... 162/158 |
| 5,492,950 | 2/1996 | Brown et al. .............. 524/166 |
| 5,512,612 | 4/1996 | Brown et al. .............. 523/218 |
| 5,536,787 | 7/1996 | Scholz et al. .............. 525/221 |
| 5,536,800 | 7/1996 | Scholz et al. ............ 526/318.4 |
| 5,550,181 | 8/1996 | Scholz .................... 524/460 |
| 5,597,654 | 1/1997 | Scholz et al. .............. 428/514 |
| 5,641,567 | 6/1997 | Brown et al. .............. 428/327 |

FOREIGN PATENT DOCUMENTS

| | | |
|---|---|---|
| 1942423 | 2/1970 | Germany . |
| 2256154 | 3/1974 | Germany . |
| 2644776 | 4/1977 | Germany . |
| 2811481 | 9/1978 | Germany . |
| 3147008 | 6/1983 | Germany . |
| 1218156 | 6/1996 | Germany . |
| 62-104886 | 5/1987 | Japan . |
| 62-104887 | 5/1987 | Japan . |
| 63-235356 | 9/1988 | Japan . |

*Primary Examiner*—Jeffrey C. Mullis
*Attorney, Agent, or Firm*—Christie, Parker & Hale, LLP

[57] ABSTRACT

Repulpable PSA compositions and constructions that exhibit high adhesive performance on a wide range of substrates are provided. In one embodiment, a PSA composition comprises a blend of two emulsion acrylic copolymers. The first type is a repulpable, emulsion acrylic copolymer that passes TAPPI UM 213. Preferably, the copolymer is prepared by sequential polymerization. The second type of copolymer is a non-repulpable, gpp or removable, repositionable, emulsion acrylic copolymer, also preferably prepared by sequential polymerization. The PSA compositions are inherently tacky and can be used in labels and tapes. In addition, they can be added to other PSAs as external tackifiers.

30 Claims, 1 Drawing Sheet

FIG. 1

REPULPABLE, PRESSURE-SENSITIVE ADHESIVE COMPOSITIONS

FIELD OF THE INVENTION

The present invention relates to pressure-sensitive adhesive (PSA) compositions, particularly emulsion acrylic PSAs that are repulpable and suitable for a variety of applications, including general purpose permanent (gpp) and removable, repositionable labels.

BACKGROUND OF THE INVENTION

Adhesive tapes, labels and other constructions are used for many purposes and are made with numerous types of adhesive compositions, including tackified and untackified rubber-based and acrylic-based PSA polymers. To be suitable for gpp or removable, repositionable label applications, a PSA should exhibit adhesion to a variety of paper, film, and metal substrates, good mandrel performance (the ability to remain adhered to a curved surface), and a favorable balance of looptack, peel and shear.

Most rubber-based and acrylic PSAs and PSA constructions are not repulpable, that is, they are not water-dispersible or water-soluble. When a PSA-coated paper label construction is subjected to the repulping (fiber shearing) process, the adhesives tend to agglomerate and form globules, commonly referred to in the trade as "stickies." Stickies adversely affect the quality of recycled paper and can have a deleterious effect on paper making equipment.

Because of a continuing interest in recycling, including recycling of paper, plastics and corrugated board, several attempts have been made to solve the stickies problem, with mixed success. One approach has been to make labels and other adhesive constructions with water-dispersible adhesive microspheres. U.S. Pat. Nos. 3,691,140 (Silver), 4,155,152 (Baker et al.), 4,495,318 (Howard), 4,598,212 (Howard), and 4,810,763 (Mallya et al.) are representative. Although adhesive microspheres disperse in the paper fibers during repulping, they are not removed from the fibers, and may cause problems if the paper fibers are subjected to another round of repulping and recycling.

Water soluble adhesives are available and can be effectively removed from paper fibers during the recycling process, but remain and concentrate in the water system. Such concentration becomes especially problematic in paper recycling mills that reuse all or part of their water supply. Water-soluble materials will eventually precipitate from the water and contaminate the paper pulp and process equipment. This results in cosmetic and functional flaws in the recycled paper product and increased maintenance and downtime to clean the recycling equipment. Further, such adhesives suffer from poor shelf life, poor humidity and/or age performance, and/or a propensity to bleed into the paper facestock (which reduces peel performance). Repulpable emulsion adhesives having a highly polar polymer structure have been developed; unfortunately, they tend to exhibit low adhesion to vinyl (olefinic) substrates, such as HDPE. Repulpable emulsion adhesive comprised of low molecular weight materials have been made; they have exhibited reduced mandrel and shear performance and a tendency to leave an adhesive residue on applied substrates.

Water-dispersible emulsion PSAs also have been made using alkyl phenol ethoxylate (APE)-type surfactants. U.S. Pat. Nos. 5,536,800 (Scholz, et al.) and 5,550,181 (Scholz) are representative. Recently, however, APE-surfactants have come under scrutiny by the environmental and medical communities.

To meet the conflicting demands of the label and tape industry, repulping industry, environmentalists, and consumers, a high-performance, repulpable, gpp or removable, repositionable label adhesive suitable for use in a wide variety of applications is needed.

SUMMARY OF THE INVENTION

The present invention provides novel, repulpable PSA compositions and constructions that exhibit high adhesive performance on a wide range of substrates and are suitable for use in a wide variety of applications, including gpp or removable, repositionable labels, wash-off consumer labels, mailing labels, postage stamps, envelopes and other applications. A repulpable adhesive can be defined as an adhesive that disperses into particles less than or equal to about 200 microns in size, after mechanical or manual pulping.

In a first aspect of the invention, a repulpable PSA composition comprises an emulsion acrylic copolymer which, when part of a paper label construction, will disperse sufficiently to pass Technical Association of The Pulp and Paper Industry Useful Method 212 (TAPPI UM 666, incorporated herein by reference) or an equivalent test, where the copolymer will pass through the screen used in the test. The copolymer may also pass TAPPI UM 213 (also incorporated by reference). A preferred, repulpable emulsion acrylic copolymer is made by sequential polymerization of a plurality of monomers, preferably at least one alkyl acrylate, at least one vinyl ester or styrenic monomer, at least one $C_3$ to $C_5$ polymerizable carboxylic acid, and at least one alkyl methacrylate. Especially preferred are repulpable, emulsion acrylic copolymers made from a plurality of monomers comprising, on a parts-by-weight basis, based on the total weight of monomers, (i) about 50 to 70 parts of at least one alkyl acrylate having about 4 to 12 carbon atoms in the alkyl group, (ii) about 10 to 20 parts of at least one vinyl ester or styrenic monomer, (iii) about 6 to 20 parts of at least one $C_3$ to $C_5$ polymerizable carboxylic acid, and (iv) about 5 to 15 parts of at least one alkyl acrylate having 1 to 3 carbon atoms in the alkyl group, and/or at least one alkyl methacrylate having 1 to 4 carbon atoms in the alkyl group. The emulsion copolymer is formed using one or more, more preferably a plurality, of nonionic, anionic, and/or cationic surfactants. In one embodiment, non-APE surfactants are employed. The repulpable PSA compositions are inherently tacky, requiring no external tackifiers. If desired for particular applications, however, external tackifier(s) can be added to the PSA composition.

In a second aspect of the invention, a repulpable PSA composition comprises an emulsified blend of two types of acrylic copolymers (i.e., a blend of two emulsion polymers), (a) and (b). The first type of copolymer is an emulsion acrylic copolymer that is itself repulpable, i.e., a repulpable copolymer as described above. Preferably, the first type of copolymer is prepared by sequential polymerization. The second type of copolymer is an emulsion acrylic copolymer which, by itself, is not necessarily, and generally isn't, repulpable. Although not required, the second type of copolymer also may be prepared by sequential polymerization. The resulting polymer blend is repulpable, and exhibits good adhesive performance on a wide variety of substrates. In order to achieve a good balance between repulpability and overall adhesive performance, the blending ratio of (a):(b) preferably is adjusted to fall with the range of from about 72:28 to 16:84; more preferably, about 70:30 to 40:60; even more preferably, about 55:45 to 45:55, on a dry weight basis (meaning, water is excluded from the weight ratio calculation).

In addition to copolymers (a) and (b), the repulpable polymer blend contains a surfactant system, preferably a mixture of nonionic, anionic, and/or cationic surfactants. The resulting emulsified blend is inherently tacky and functions as a repulpable PSA, without requiring external tackifiers. If desired for particular applications, however, external tackifier(s) can be added to the blend.

When coated on or otherwise applied to a facestock or release liner, the new PSA compositions are repulpable and function as gpp or removable, repositionable, label adhesives. The new PSAs exhibit improved adhesion to polyolefins, especially HDPE, improved adhesion to cardboard substrates, such as recycled corrugated board, and overall adhesive performance comparable to gpp or movable, repositionable, label adhesives. Mandrel performance is also improved. Yet, through careful selection of monomers and surfactants, the PSA compositions of the present invention are believed to be less expensive to make than the aforementioned standard repulpable adhesives.

In another aspect of the invention, a method for making an otherwise non-repulpable PSA is provided, and comprises blending with a non-repulpable PSA a sufficient amount of a repulpable acrylic copolymer to render the resulting blend repulpable, as defined above.

In still another aspect of the invention, the PSA compositions described herein can be added to other commercially available adhesives, as adhesion promotors.

DETAILED DESCRIPTION OF THE INVENTION

According to the present invention, there are provided novel PSA compositions and constructions that are both repulpable and exhibit excellent adhesion to a wide variety of substrates, and are suitable for many applications, including gpp or removable, repositionable labels and other products. In one embodiment, a PSA composition comprises an emulsion acrylic copolymer which is repulpable (passes TAPPI UM 213). Preferably, the repulpable acrylic copolymer is prepared by sequential polymerization of a plurality of monomers, rather than by batch polymerization.

A preferred, repulpable, emulsion acrylic copolymer is prepared from a plurality of monomers, comprising at least one alkyl acrylate, at least one vinyl ester or styrenic monomer, at least one $C_3$ to $C_5$ polymerizable carboxylic acid, and at least one alkyl methacrylate, and has a glass transition temperature, $T_g$, of about −15° C. to −50° C., as measured by differential scanning calorimetry (DSC), and a number average molecular weight, $M_N$, of about 12,000 to 21,000, as measured by gel permeation chromatography (GPC).

Nonlimiting examples of suitable alkyl acrylates include short chain alkyl acrylates having 1 to 3 carbon atoms in the alkyl group, e.g., methyl, ethyl and propyl acrylate; medium chain alkyl acrylates having about 4 to 12 carbon atoms in the alkyl group, e.g., butyl, 2-ethylhexyl, isooctyl, and isodecyl acrylate; and maleate monomers, such as di(2-ethylhexyl) maleate. Formulations based on butyl acrylate and 2-ethylhexyl acrylate, with or without small amounts of methyl or ethyl acrylate, are particularly preferred.

Nonlimiting examples of vinyl ester and styrenic monomers useful in the practice of the present invention include vinyl acetate, vinyl propionate, vinyl butyrate, vinyl isobutyrate, vinyl valerate, vinyl versitate, styrene, and α-methyl styrene, with vinyl acetate being preferred.

Nonlimiting examples of $C_3$ to $C_5$ polymerizable carboxylic acids useful in the present invention include such monomers as acrylic acid, methacrylic acid, itaconic acid, and the like, with acrylic acid or a mixture of acrylic and methacrylic acid being preferred.

Nonlimiting examples of useful alkyl methacrylates include methyl methacrylate, ethyl methacrylate, and butyl methacrylate, with methyl methacrylate being preferred.

A particularly preferred, repulpable acrylic copolymer is sequentially polymerized from 2-ethylhexyl acrylate, vinyl acetate, methyl acrylate, acrylic acid and methacrylic acid. More preferably, the copolymer comprises, on a dry weight basis, based on the total weight of monomers forming the copolymer, (i) about 50 to 70 parts by weight of 2-ethylhexyl acrylate, (ii) about 10 to 20 parts by weight of vinyl acetate, (iii) about 5 to 15 parts by weight of methyl acrylate, (iv) about 5 to 15 parts by weight of acrylic acid and (v) about 1 to 10 parts by weight of methacrylic acid.

The repulpable, emulsion acrylic copolymer is prepared by free-radical polymerization, preferably in an oxygen-free atmosphere, in the presence of suitable polymerization initiators and emulsiers (surfactants), as described below.

In a second aspect of the invention, a repulpable PSA composition comprises a blend of two emulsion acrylic copolymers, the first of which is itself repulpable, as described above. The second copolymer, however, need not be inherently repulpable. In one embodiment, a non-repulpable acrylic copolymer is prepared from a plurality of monomers, nonlimiting examples of which are provided above. The non-repulpable copolymer preferably has a $T_g$ of about −15 to −50° C., more preferably, −30 to −40° C., and a $M_N$ of about 70,000 to 90,000.

In one embodiment, the non-repulpable copolymer is substantially as described in U.S. Pat. No. 5,221,706 (Lee et al.), assigned to Avery Dennison (see e.g., base Polymer I). Other nonlimiting examples of suitable, non-repulpable emulsion acrylic copolymers are described in U.S. Pat. Nos. 5,492,950 (Brown et al.) and 5,164,444 (Bernard), both of which are assigned to Avery Dennison. In another embodiment, the non-repulpable, emulsion acrylic copolymer is made from at least one alkyl acrylate, at least one vinyl ester or styrenic monomer, at least one $C_3$ to $C_5$ polymerizable carboxylic acid, and at least one alkyl methacrylate, in the presence of at least two of the surfactants identified below. One non-limiting example of such a copolymer comprises, on a parts by weight basis, based on the total weight of monomers, (i) about 10 to 20 parts 2-ethylhexyl acrylate, (ii) about 60 to 80 parts butyl acrylate, (iii) about 2 to 10 parts methyl acrylate, (iv) about 2 to 10 parts vinyl acetate, (v) about 1 to 5 parts acrylic acid, and (vi) about 1 to 5 parts methacrylic acid.

Both the repulpable and non-repulpable emulsion acrylic copolymers are prepared by free-radical polymerization, preferably in an oxygen-free atmosphere, in the presence of suitable polymerization initiators and emulsifiers (surfactants). Enough surfactant is included to form a stable emulsion, without causing phase separation. One or more activators, redox agents and chain transfer agents are also preferably employed in the reaction. In one embodiment, potassium hydroxide is added to control foaming.

Nonionic, anionic, and/or cationic surfactants are advantageously used in the emulsion polymerization of acrylic monomers, with a plurality of surfactants being preferred.

Nonlimiting examples of surfactants useful in the practice of the present invention include cetyl trimethyl ammonium bromide, available from Aldrich (Milwaukee, Wis.); AR-150, a nonionic, ethoxylated rosin acid emulsifier available from Hercules, Inc. (Wilmington, Del.); Alipal CO-436, a sulfated nonylphenol ethoxylate, available from Rhone-Poulenc; Trem LF40, a sodium alkyl allyl sulfosuccinate surfactant, available from Henkel of America, Inc. (King of Prussia, Pa.); sodium pyrophosphate, available from J. T. Baker (Mallinckrodt Baker, Inc., Phillipsburg, N.J.); Disponil FES77, a sodium lauryl ether sulfate surfactant, available from Henkel; Aerosol OT-75, a sodium dioctyl sulfosuccinate surfactant, available from American Cyanamid (Wayne, N.J.); Polystep F-9, a nonylphenol ethoxylate, and Polystep B-27, a sodium nonylphenol ethoxylated sulfated, both available from Stepan Company, Inc. (Winnetka, Ill.); and disodium ethoxylated alkyl alcohol half esters of sulfosuccinic acid, described in U.S. Pat. No. 5,221,706, and available from VWR Scientific Corp., Sargent-Welch Division (Westchecster, Pa.). Other surfactants include the Triton X-series of surfactants made by Union Carbide (Danbury, Conn.).

In one embodiment, the repulpable, emulsion acrylic copolymer is emulsified with a sodium alkyl allyl sulfosuccinate and a sodium nonylphenol ethoxylated sulfate surfactant system. Alternatively, non-APE surfactants can be used. The non-repulpable emulsion acrylic copolymer can be emulsified with, for example, a sodium lauryl ether and sodium dioctyl sulfosuccinate surfactant system, or other suitable surfactants or surfactant systems.

Nonlimiting examples of useful polymerization initiators include water-soluble initiators, for example, persulfates, such as sodium persulfate ($Na_2S_2O_8$) and potassium persulfate; peroxides, such as hydrogen peroxide and tert-butyl hydroperoxide (t-BHP); and azo compounds, such as VAZO™ initiators; used alone or in combination with one or more reducing agents or activators, for example, bisulfites, metabisulfites, ascorbic acid, erythorbic acid, sodium formaldehyde sulfoxylate, ferrous sulfate, ferrous ammonium sulfate, and ferric ethylenediamine tetraacetic acid. Enough initiator is used to promote free-radical polymerization of the monomers.

It is also preferred to employ a small amount (e.g., from about 0.01 to 0.5% by weight of the monomers) of a chain transfer agent or other molecular weight regulator, to control average polymer chain length of the acrylic copolymers. Nonlimiting examples include n-dodecyl mercaptan (n-DDM), t-dodecyl mercaptan (t-DDM), monothioglycerol, mercapto acetates, and long chain alcohols.

Figure 1:
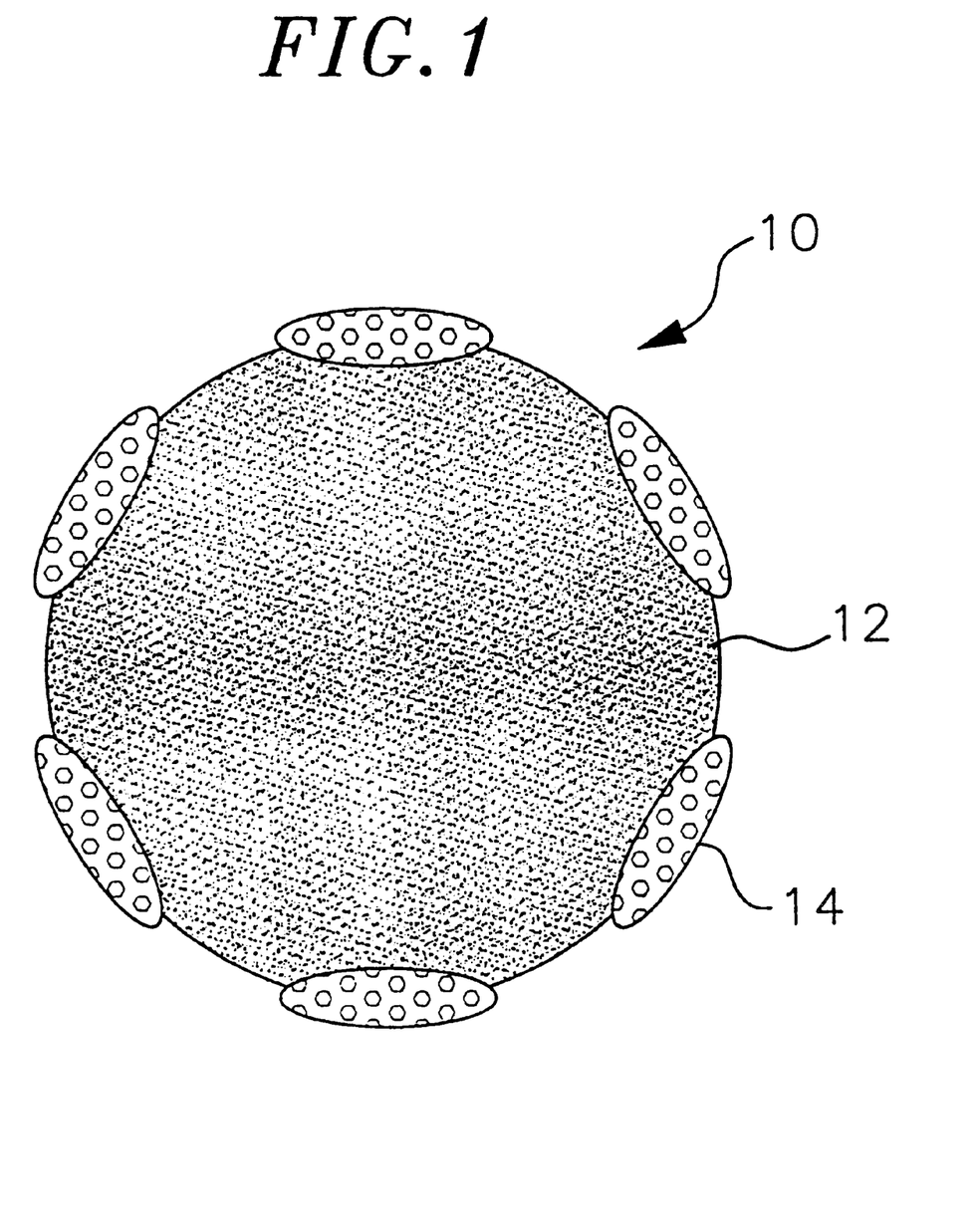
FIG. 1 schematically illustrates a domain-type, copolymerized particle prepared by sequential polymerization.

Polymerization is carried out by, e.g., preparing a pre-emulsion of monomers and commencing polymerization using free-radical initiators. The pre-emulsion can be introduced into the reactor as a single charge, or fed in incrementally, to control the rate of reaction. More preferably, especially in the case of the repulpable-emulsion acrylic copolymer, sequential polymerization is used, and the plurality of monomers are emulsified and allowed to react in distinct stages. To that end, separate pre-emulsions of monomers, surfactants, initiators and other components are prepared, a reactor is charged with an initial soap (surfactant) solution and catalyst (initiator) solution, a first pre-emulsion of monomers is gradually fed into the reactor, and polymerization is initiated and allowed to propagate. After polymerization of the first pre-emulsion, a second pre-emulsion of monomers is gradually fed into the reactor and polymerization continues. The result is a copolymer system of emulsified copolymer particles quite distinct from emulsion copolymers prepared by batch polymerization. Although not bound by theory, it is believed that sequential polymerization of the two monomeric pre-emulsions results in an emulsion of domain-type copolymeric particles, each having an inner core of first copolymeric composition and an outer shell or region of second copolymeric composition, partially or totally encapsulating the core. FIG. 1 provides a schematic illustration of one hypothesis of the appearance of such a particle 10 formed by sequential polymerization, having an inner core region 12 and an outer shell or series of regions 14 partially surrounding the core.

In some embodiments, it is preferred that the copolymer particles resulting from polymerization of the first pre-emulsion comprise at least 50%, more preferably at least 60%, still more preferably about 90%, by weight of the final copolymer system. If chain transfer agents are included in either or both of the charges, and monomer addition rates and/or monomer compositions are varied, the average molecular weight and composition of the separately copolymerized charges can be significantly distinct, with consequent impact on the properties of the emulsified copolymeric particles. Indeed, it has been found that the products of sequential polymerization generally exhibit properties demonstrably different from copolymers prepared by non-sequential processes.

Although not preferred, in some embodiments a crosslinking agent can be added to either or both of the pre-emulsions to facilitate internal crosslinking (crosslinking of the inner core region). Alternatively, external crosslinking (crosslinking between individual emulsified particles) can be facilitated by the addition of a crosslinking agent to the polymerized reaction mixture.

Once the repulpable and non-repulpable emulsion acrylic copolymers are prepared (whether by sequential polymerization or otherwise), they are blended together, thereby providing an inherently tacky, coatable, PSA composition that is repulpable. To ensure that the polymer blend is both repulpable and exhibits a good balance of adhesive properties, careful control of the blending ratio is essential. In one embodiment, the dry weight ratio of repulpable copolymer: non-repulpable copolymer lies within the range of about 72:28 to about 16:84. More preferably, the repulpable: non-repulpable copolymer blending ratio falls within the range of about 70:30 to 40:60, even more preferably, about 55:45 to 45:55, on a dry weight basis. In some of the examples described below, particularly good results have been obtained using a dry weight blending ratio of about 49:51. For repulpable and non-repulpable emulsion acrylic copolymers with a total solids content of about 52 and 67%, respectively, this equates to a wet weight blending ratio of about 54:46.

Repulpable PSA compositions prepared as a blend of copolymers exhibit improved adhesion to polyolefins, especially high density polyethylene, improved adhesion to corrugated board substrates, and improved mandrel performance, relative to the mandrel performance of standard repulpable PSA compositions. In addition, overall adhesive performance of such blended polymers is comparable to or better than that of other general purpose industrial adhesives.

Although inherently tacky, both the repulpable, emulsion acrylic copolymers and the repulpable polymer blends can be further tackified with one or more tackifying additives (tackifiers). Nonlimiting examples include modified and unmodified hydrocarbon resins, rosins and rosin esters.

Hydrogenated rosin is a nonlimiting example of a modified rosin tackifier. Other nonlimiting examples of tackifiers include SnowTack 301 A, an aqueous anionic dispersion of modified rosin, and SnowTack 377F, an aqueous dispersion of modified rosin, both of which are available from Akzo Nobel Chemicals Inc., Chemical Division/Akzo NV (Chicago, Ill.). Suitable tackifiers are also described or identified in U.S. Pat. Nos. 5,492,950 (Brown et al.) and 5,623,011 (Bernard), both assigned to Avery Dennison. In one embodiment of the present invention, one or more tackifiers is added to the repulpable polymer or repulpable polymer blend in an amount of from about 5 to 25 parts by weight per 100 parts of polymer (or polymer blend), on a dry weight basis. In some embodiments, the tackifier(s) have an acid number of from about 30 to 60 and a ring and ball softening point of from about 50 to 70° C.

In another aspect of the invention, the repulpable, emulsion acrylic copolymers—more preferably, the repulpable, emulsified polymer blends—are used to prepare inherently tacky PSA constructions such as labels, tapes and the like. To that end, an emulsified polymer blend is coated on or otherwise applied to a release liner, dried, and married or laminated to a paper. polymeric material or film, or other flexible facestock, for example, metal foil and corrugated board. Alternatively, the PSA compositions are directly applied to a facestock, dried, and then married or laminated to a release liner. Linerless PSA constructions also can be made with the new repulpable PSA compositions.

Non-limiting examples of paper facestocks suitable for use with the present invention include offset, bond, text, cover, index, lightweight printing paper, litho paper, and sulfite paper. Non-limiting examples of plastic facestocks include polystyrene, polyvinyl chloride, polyester, nylon, and polyolefin (for example, polyethylene) films. Films made of polymer blends are also included. Polymer films may be cast, extruded or co-extruded.

The PSA compositions are readily applied to a release liner or facestock using a conventional coating or other application technique. Non-limiting examples include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. In general, the PSA compositions are applied to a substrate and dried to a desired coat weight. In both laboratory and pilot scale-up experiments on vellum and DSX paper facestocks, good results have been seen with dried coat weights of about $20\pm2$ g/m$^2$.

EXAMPLES

In the examples and tables that follow, the following abbreviations are used:

Monomers

| | |
|---|---|
| 2-EHA | 2-ethylhexyl acrylate |
| BA | butyl acrylate |
| VAc | vinyl acetate |
| MA | methyl acrylate |
| EA | ethyl acrylate |
| AA | acrylic acid |
| MAA | methacrylic acid |

Surfactants

| | |
|---|---|
| AR-150 | nonionic, ethoxylated rosin acid emulsifier |
| CO-436 | Alipal CO-436, a sodium salt of sulfated nonylphenol ethoxylate |
| Trem LF40 | sodium alkyl allyl sulfosuccinate, an anionic surfactant |
| TSPP | sodium pyrophosphate |
| Disponil FES77 | sodium lauryl ether sulfate surfactant |
| Aerosol OT-75 | sodium dioctyl sulfosuccinate surfactant |
| F-9 | Polystep F9, a nonylphenol ethoxylate |
| B-27 | Polystep B-27, a sodium nonylphenol ethoxylate sulfate |
| DSEA | disodium ethoxylated alkyl alcohol half ester of sulfosuccinic acid |

Catalysts initiators, and other

| | |
|---|---|
| AWC | sodium formaldehyde sulfoxylate |
| Fe-EDTA | ferric salt of ethylenediaminetetraacetic acid |
| t-BHP | tert-butyl hydroperoxide |
| nDDM | n-dodecyl mercaptan |
| Di-water | deionized water |
| Kathon LX | 3(2H)-isothiazolone, 5-chloro-2-methyl |
| ST 301A | SnowTack 301A aqueous anionic disperson of modified rosin |

Substrates

| | |
|---|---|
| S.S. | stainless steel |
| HDPE | high density polyethylene |
| R.C. | recycled corrugated board |

Adhesive Failure Modes

| | |
|---|---|
| Pt | paper tear |
| P | panel failure |
| Fp | fiber pick |
| c | cohesive failure |
| Lps | light panel stain |
| Z | Zippy |

Example 1–7: Repulpable Copolymers

In each of Examples 1–7, a repulpable, emulsion acrylic copolymer was prepared by sequential polymerization using the polymerization protocol described below. The identities and amounts of monomers, surfactants, initiators and other components are provided in Table 1.

A jacketed, multi-neck reaction vessel equipped with nitrogen inlet valve, stirrer and thermometer was charged with initial reactor charge C—a deionized water solution of surfactants, hydrogen peroxide and Fe-EDTA—and the temperature raised to 70° C.

In four separate vessels, soap solutions A1 and A2 and monomer charges B1 and B2 were prepared. Pre-emulsions I and II were prepared by mixing soap solution A1 and monomer charge B1, and soap solution A2 and monomer charge B2, respectively.

Catalyst charge E was added to the reactor, at 70° C., and mixed for 5 minutes. Pre-emulsion I was then fed into the reactor, along with catalyst charge D, over a 90 minute period. Thereafter, pre-emulsion II was fed into the reactor, while continuing the feed of catalyst charge D, over a 90 minute period. After completion of the monomer and catalyst feeds, the reactor was held at 70° C. for an additional 30 min. to cook off any residual monomers.

Separate aqueous solutions, F1 (t-BHP) and F2 (L-ascorbic acid), were introduced to the reactor in two stages. First, one-half of F1 and F2 was added, followed, 15 minutes later, by the other half of F1 and F2. The reactor was held at 70° for 60 to 90 more min. and then cooled to 35° C.

A biocide (Kathon LX, available from Rohm & Haas Company, Inc. (Philadelphia, Pa.) was added to the reactor as a 1.5 percent aqueous solution.

The resulting repulpable, emulsion acrylic copolymers had a pH of from about 5 to 6, more preferably, 5.2 to 5.5.

Example 1 contained 52% total solids, as determined by gravimetric analysis. Its $T_g$ was about −33° C., as determined by DSC. Whereas Example 1 was formulated with two acid monomers, AA and MAA, Example 2 has only one acid monomer, AA. Example 4 contains a single surfactant (Alipal CO-436). Examples 3 and 7 have higher molecular weights than Examples 1, 2 and 4 and, therefore, are characterized by higher shear, higher mandrel performance and lower edge bleed, but reduced tack adhesion to HDPE and glass. Examples 5 and 6 contain non-APE surfactants. In each case, repulpable copolymers were formed with relative low acid monomer content, and without having to include polar monomers such as hydroxyethyl methacrylate. Consequently, the copolymers have lower $T_g$ values and better adhesion properties than more acidic copolymers.

TABLE 1

Repulpable, Emulsion Acrylic Copolymers

|  | Example 1 Parts by weight | | | | Example 2 (one acid system) Parts by weight | | | |
| --- | --- | --- | --- | --- | --- | --- | --- | --- |
|  | Charge 1 | Charge 2 | 1 + 2 | 1 + 2, dry | Charge 1 | Charge 2 | 1 + 2 | 1 + 2, dry |
| A) Soap solution | | | | | | | | |
| Di-water | 112.5 | 112.5 | 225 | 0 | 112.5 | 112.5 | 225 | 0 |
| CO-436 (28%) | 13.5 | 13.5 | 27 | 7.56 | 18 | 18 | 36 | 10 |
| Trem LF-40 (40%) | 4.5 | 4.5 | 9 | 3.6 | 0 | 0 | 0 | 0 |
| B) Monomers | | | | | | | | |
| 2-EHA | 168.75 | 168.75 | 337.5 | 337.5 | 168.75 | 168.75 | 337.5 | 337.5 |
| VAc | 70 | 0 | 70 | 70 | 70 | 0 | 70 | 70 |
| MA | 25 | 25 | 50 | 50 | 50 | 50 | 100 | 100 |
| AA | 23 | 23 | 46 | 46 | 28 | 28 | 56 | 56 |
| MAA | 6 | 6 | 12 | 12 | 0 | 0 | 0 | 0 |
| nDDM | 1.25 | 1.25 | 2.5 | 2.5 | 1.25 | 1.25 | 2.5 | 2.5 |
| t-BHP (70%) | 0.9 | 0.9 | 1.8 | 1.26 | 0.9 | 0.9 | 1.8 | 1.26 |
| Potassium persulfate | 0.43 | 0.43 | 0.86 | 0.86 | 0.43 | 0.43 | 0.86 | 0.86 |
| Sodium Bicarbonate | 2.5 | 2.5 | 5 | 5 | 2.5 | 2.5 | 5 | 5 |
| C) Initial reactor charge | | | | | | | | |
| Di-water |  | 150 |  | 0 |  | 160 |  | 0 |
| CO-436 |  | 30 | 30 | 8.4 |  | 40 | 40 | 11.2 |
| Trem LF-40 |  | 10 | 10 | 4 |  | 0 | 0 | 0 |
| $H_2O_2$ |  | 7.5 | 7.5 | 0 |  | 7.5 | 7.5 | 0 |
| Fe-EDTA |  | 0.1 | 0.1 | 0.1 |  | 0.1 | 0.1 | 0.1 |
| D) Catalyst solution for incremental feed | | | | | | | | |
| Di-water | 100 |  | 100 | 0 | 100 |  | 100 | 0 |
| AWC | 0.75 |  | 0.75 | 0.75 | 0.75 |  | 0.75 | 0.75 |
| E) Catalyst for initial charge | | | | | | | | |
| Potassium persulfate | 2.25 |  | 2.25 | 2.25 | 2.25 |  | 2.25 | 2.25 |
| Sodium Bicarbonate | 9 |  | 9 | 9 | 9 |  | 9 | 9 |
| Di-water | 10 |  | 10 | 0 | 10 |  | 10 | 0 |
| F) Post addition | | | | | | | | |
| t-BHP | 0.5 |  | 0.5 | 0.35 | 0.5 |  | 0.5 | 0.35 |
| L-Ascorbic acid | 0.1125 |  | 0.1125 | 0.1125 | 0.1125 |  | 0.1125 | 0.1125 |
| DI-water | 2 |  | 2 | 0 | 2 |  | 2 | 0 |
| Biocide, Kathon LX | 0.8 |  | 0.8 | 0.01 | 0.8 |  | 0.8 | 0.01 |

TABLE 1-continued

Repulpable, Emulsion Acrylic Copolymers

| | Example 4 (one surfactant system) Parts by weight | | | |
|---|---|---|---|---|
| | Charge 1 | Charge 2 | 1 + 2 | 1 + 2, dry |
| A) Soap solution | | | | |
| Di-water | 112.5 | 112.5 | 225 | 0 |
| CO-436 (28%) | 23.5 | 23.5 | 47 | 13.16 |
| Trem LF-40 (40%) | 0 | 0 | 0 | 0 |
| B) Monomers | | | | |
| 2-EHA | 168.75 | 168.75 | 337.5 | 337.5 |
| VAc | 70 | 0 | 70 | 70 |
| MA | 25 | 25 | 50 | 50 |
| AA | 23 | 23 | 46 | 46 |
| MAA | 6 | 6 | 12 | 12 |
| nDDM | 1.25 | 1.25 | 2.5 | 2.5 |
| t-BHP (70%) | 0.9 | 0.9 | 1.8 | 1.26 |
| Potassium persulfate | 0.43 | 0.43 | 0.86 | 0.86 |
| Sodium Bicarbonate | 2.5 | 2.5 | 5 | 5 |
| C) Initial reactor charge | | | | |
| Di-water | | 150 | | 0 |
| CO-436 | | 10 | 10 | 2.8 |
| Trem LF-40 | | 0 | 0 | 0 |
| $H_2O_2$ | | 0 | 0 | 0 |
| Fe-EDTA | | 0.1 | 0.1 | 0.1 |
| D) Catalyst solution for incremental feed | | | | |
| Di-water | 100 | | 100 | 0 |
| AWC | 0.75 | | 0.75 | 0.75 |
| E) Catalyst for initial charge | | | | |
| Potassium persulfate | 2.25 | | 2.25 | 2.25 |
| Sodium Bicarbonate | 9 | | 9 | 9 |
| Di-water | 10 | | 10 | 0 |
| F) Post addition | | | | |
| t-BHP | 0.5 | | 0.5 | 0.35 |
| L-Ascorbic acid | 0.1125 | | 0.1125 | 0.1125 |
| Di-water | 2 | | 2 | 0 |
| Biocide, Kathon LX | 0.8 | | 0.8 | 0.01 |

| | Example 3 (high mw version) Parts by weight | | | | Example 7 (No MA) Parts by weight | | | |
|---|---|---|---|---|---|---|---|---|
| | Charge 1 | Charge 2 | 1 + 2 | 1 + 2, dry | Charge 1 | Charge 2 | 1 + 2 | 1 + 2, dry |
| A) Soap solution | | | | | | | | |
| Di-water | 90 | 61.8 | 151.8 | 0 | 90 | 61.8 | 151.8 | 0 |
| B-27 (30%) | 17.5 | 24.51 | 42.01 | 12.6 | 17.5 | 24.51 | 42.01 | 12.6 |
| F-9 (70%) | 2.5 | 3.53 | 6.03 | 4.22 | 2.5 | 3.53 | 6.03 | 4.22 |
| Potassium persulfate | 0.36 | 0.42 | 0.78 | 0.78 | 0.36 | 0.34 | 0.7 | 0.7 |
| Sodium Bicarbonate | 1.875 | 1.875 | 3.75 | 3.75 | 1.875 | 1.875 | 3.75 | 3.75 |
| B) Monomers | | | | | | | | |
| 2-EHA | 50 | 168.75 | 218.75 | 218.75 | 175 | 193.75 | 368.75 | 368.75 |
| BA | 95.64 | 0 | 95.64 | 95.64 | 21 | 0 | 21 | 21 |
| VAc | 70 | 0 | 70 | 70 | 40 | 0 | 40 | 40 |
| MA | 25 | 25 | 50 | 50 | 0 | 0 | 0 | 0 |
| AA | 20 | 5 | 25 | 25 | 6 | 6 | 12 | 12 |
| MAA | 6 | 30 | 36 | 36 | 23 | 23 | 46 | 46 |
| nDDM | 0.15 | 1.25 | 1.37 | 1.37 | 0 | 1 | 1 | 1 |
| t-BHP (70%) | 0.9 | 0.9 | 1.8 | 1.26 | 0.9 | 0.9 | 1.8 | 1.26 |
| C) Initial reactor charge | | | | | | | | |
| Di-water | | 120 | | 0 | | 120 | | 0 |
| AR150 | | 30 | 0 | 30 | | 30 | 30 | 30 |
| Trem LF-40 | | 0 | 0 | 0 | | 10 | 10 | 4 |
| $H_2O_2$ | | 7.5 | 7.5 | 0 | | 7.5 | 7.5 | 0 |
| SVC (25%) | | 10 | 10 | 2.5 | | 0 | 0 | 0 |
| Fe-BDTA | | 0.1 | 0.1 | 0.1 | | 0.1 | 0.1 | 0.1 |

TABLE 1-continued

Repulpable, Emulsion Acrylic Copolymers

| | | | | | | | |
|---|---|---|---|---|---|---|---|
| D) Catalyst solution for incremental feed | | | | | | | |
| Di-water | 90 | 90 | 0 | | 90 | 90 | 0 |
| AWC | 0.75 | 0.75 | 0.75 | | 0.75 | 0.75 | 0.75 |
| E) Catalyst for initial charge | | | | | | | |
| Potassium persulfate | 2.25 | 2.25 | 2.25 | | 2.25 | 2.25 | 2.25 |
| Sodium Bicarbonate | 9 | 9 | 9 | | 9 | 9 | 9 |
| Di-water | 8 | 8 | 0 | | 8 | 8 | 0 |
| F) Post addition | | | | | | | |
| t-BHP | 0.5 | 0.5 | 0.35 | | 0.5 | 0.5 | 0.35 |
| L-Ascorbic acid | 0.1125 | 0.1125 | 0.1125 | | 0.1125 | 0.1125 | 0.1125 |
| Di-water | 2 | 2 | 0 | | 2 | 2 | 0 |
| Biocide, Kathon LX | 0.8 | 0.8 | 0.01 | | 0.8 | 0.8 | 0.01 |

| | Example 5 (non-APE surfactant) Parts by weight | | | | Example 6A (non-APE, with EA monomer) Parts by weight | | | |
|---|---|---|---|---|---|---|---|---|
| | Charge 1 | Charge 2 | 1 + 2 | 1 + 2, dry | Charge 1 | Charge 2 | 1 + 2 | 1 + 2, dry |
| A) Soap solution | | | | | | | | |
| Di-water | 100 | 100 | 200 | 0 | 80 | 100 | 180 | 0 |
| T.S.P.P. (59.7%) | 1 | 1 | 2 | 1.19 | 1 | 1 | 2 | 1.19 |
| Disponil FES77 (32.5%) | 30 | 25 | 55 | 17.88 | 30 | 25 | 55 | 17.88 |
| Aerosol OT-75 (75%) | 3.25 | 2.75 | 6 | 4.5 | 3.25 | 2.75 | 6 | 4.5 |
| Potassium persulfate | 0.43 | 0.43 | 0.86 | 0.86 | 0.43 | 0.43 | 0.86 | 0.86 |
| Sodium bicarbonate | 2 | 2 | 4 | 4 | 2 | 2 | 4 | 4 |
| B) Monomers | | | | | | | | |
| 2-EHA | 53.75 | 168.75 | 222.5 | 222.5 | 70 | 168.75 | 238.75 | 238.75 |
| BA | 95 | 0 | 95 | 95 | 95 | 0 | 95 | 95 |
| VAc | 70 | 0 | 70 | 70 | 70 | 0 | 70 | 70 |
| MA | 25 | 25 | 50 | 50 | 10 | 10 | 20 | 20 |
| EA | 0 | 0 | 0 | 0 | 15 | 15 | 30 | 30 |
| AA | 23 | 23 | 46 | 46 | 28 | 28 | 56 | 56 |
| MAA | 6 | 6 | 12 | 12 | 6 | 6 | 12 | 12 |
| nDDM | 0.5 | 1.1 | 1.6 | 1.6 | 0.6 | 1.1 | 1.7 | 1.7 |
| t-BHP (70%) | 0.9 | 0.9 | 1.8 | 1.26 | 0.9 | 0.9 | 1.8 | 1.26 |
| C) Initial reactor charge | | | | | | | | |
| Di-water | | 150 | | 0 | | 130 | | 0 |
| FES77 | | 10 | 10 | 3.25 | | 10 | 10 | 3.25 |
| Fe-EDTA | | 0.1 | 0.1 | 0.1 | | 0.1 | 0.1 | 0.1 |
| D) Catalyst solution for incremental feed | | | | | | | | |
| Di-water | | 100 | 100 | 0 | | 80 | 80 | 0 |
| AWC | | 0.75 | 0.75 | 0.75 | | 0.75 | 0.75 | 0.75 |
| E) Catalyst for initial charge | | | | | | | | |
| Potassium persulfate | | 2.25 | 2.25 | 2.25 | | 2.25 | 2.25 | 2.25 |
| Sodium Bicarbonate | | 9 | 9 | 9 | | 9 | 9 | 9 |
| Di-water | | 12 | 12 | 0 | | 12 | 12 | 0 |
| F) Post addition | | | | | | | | |
| t-BHP | | 0.5 | 0.5 | 0.35 | | 0.5 | 0.5 | 0.35 |
| L-Ascorbic acid | | 0.1125 | 0.1125 | 0.1125 | | 0.1125 | 0.1125 | 0.1125 |
| Di-water | | 2 | 2 | 0 | | 2 | 2 | 0 |
| Biocide, Kathon LX | | 0.8 | 0.8 | 0.01 | | 0.8 | 0.8 | 0.01 |

| | Example 6B (like 6A, but no EA) Parts by weight | | | |
|---|---|---|---|---|
| | Charge 1 | Charge 2 | 1 + 2 | 1 + 2, dry |
| A) Soap solution | | | | |
| Di-water | 80 | 100 | 180 | 0 |
| T.S.P.P. (59.7%) | 1 | 1 | 2 | 1.19 |
| Disponil FES77 (32.5%) | 30 | 25 | 55 | 17.88 |
| Aerosol OT-75 | | | | |

TABLE 1-continued

Repulpable, Emulsion Acrylic Copolymers

| | | | | |
|---|---|---|---|---|
| (75%) | 3.25 | 2.75 | 6 | 4.5 |
| Potassium persulfate | 0.43 | 0.43 | 0.86 | 0.86 |
| Sodium bicarbonate | 2 | 2 | 4 | 4 |
| B) Monomers | | | | |
| 2-EHA | 70 | 168.75 | 238.75 | 238.75 |
| BA | 95 | 0 | 95 | 95 |
| VAc | 70 | 0 | 70 | 70 |
| MA | 25 | 25 | 50 | 50 |
| EA | 0 | 0 | 0 | 0 |
| AA | 23 | 23 | 46 | 46 |
| MAA | 6 | 6 | 12 | 12 |
| nDDM | 0.6 | 1.1 | 1.7 | 1.7 |
| t-BHP (70%) | 0.9 | 0.9 | 1.8 | 1.26 |
| C) Initial reactor charge | | | | |
| Di-water | | 150 | | 0 |
| FES77 | | 10 | 10 | 3.25 |
| Fe-EDTA | | 0.1 | 0.1 | 0.1 |
| D) Catalyst solution for incremental feed | | | | |
| Di-water | | 80 | 80 | 0 |
| AWC | | 0.75 | 0.75 | 0.75 |
| E) Catalyst for initial charge | | | | |
| Potassium persulfate | | 2.25 | 2.25 | 2.25 |
| Sodium Bicarbonate | | 9 | 9 | 9 |
| Di-water | | 12 | 12 | 0 |
| F) Post addition | | | | |
| t-BHP | | 0.5 | 0.5 | 0.35 |
| L-Ascorbic acid | | 0.1125 | 0.1125 | 0.1125 |
| Di-water | | 2 | 2 | 0 |
| Biocide, Kathon LX | | 0.8 | 0.8 | 0.01 |

Examples 8–12 (13): Blended PSA Compositions

In each of Examples 8–13, a repulpable, PSA composition was prepared by physically blending a repulpable, emulsion acrylic copolymer (Ex. 1 or Ex. 6) with a non-repulpable, emulsion acrylic copolymer, A or B or C. Non-repulpable copolymer A was prepared according to U.S. Pat. No. 5,221,706 ("polymer I" described at col. 4, lines 57–67). Non-repulpable copolymer B was prepared according to U.S. Pat. No. 5,164,444 (Ex. 3, described at col. 7 and 8). Non-repulpable copolymer C was prepared as follows:

There was formed a reactor charge containing a solution of 0.9 g of Disponil FES-32 dissolved in 123 g of deionized water. A pre-emulsion feed soap solution was formed by dissolving 0.39 g of Aerosol OT-75, 2.61 g of Disponil FES-32 and 3.9 g of Polystep F-4 in 110 g of deionized water.

A monomer mix was made up with 240 g of 2-ethyl hexyl acrylate, 55 g of n-butyl acrylate, 55 of methyl methacrylate, 6.5 g of methacrylic acid, 9.1 g of acrylic acid and 0.238 g of n-dodecyl mercaptan. The monomer mix was added to the pre-emulsion solution with mixing and was stirred till the viscosity was about 2000 cps (Brookfield, RV,#3@12 rpm).

An "Aqueous Feed 1" solution was prepared by dissolving 0.74 g of Disponil FES-32, 1.25 g Polystep F-5 and 0.5 g of potassium persulfate in 70 g of deionized water.

An "Aqueous Feed 2" solution was prepared by mixing 0.50 g of potassium persulfate in 50 g of deionized water.

A kickoff initiator solution was formed of 0.75 g of potassium persulate in 15 g of deionized water.

The reactor charge was introduced to a 1 liter reactor and was flushed with nitrogen. The reactor charge was heated to 78° C. and the kickoff initiator solution added. The mixture were held for 10 minutes at 78° C. The pre-emulsion feed was started at the rate of 1.99 g/min. Ten minutes after start of pre-emulsion feed, the Aqueous Feed 1 was added at the rate of 0.6 g/min. The pre-emulsion was added over four hours. Aqueous Feed 1 was added over two hours. After completion of addition of the Aqueous Feed 1, Aqueous Feed 2 was started and added at the rate of 0.42 g/min. for two hours. Through out the feeds, the temperature inside the reactor was maintained at about 80° C. After the feeds were completed, the contents were held at 80° C. for an additional 45 minutes and then cooled.

The final solids were 50.44%, pH was 2.3 and latex viscosity was 480 cps (Brookfield, RV,#4@20 rpm). The latex was neutralized with a dilute ammonium hydroxide solution to a pH of 7.8. The final viscosity was 3100 cps (Brookfield, RV,#4@20 rpm) and particle diameter was 114 nm.

Table 2 summarizes the blend compositions and repulpable:non-repulpable dry weight ratios each of examples 8–13. Repulpability was evaluated in accordance with TAPPI UM 213, using the following procedure: A polymer blend was coated on a paper facestock and dried. The coated facestock was immersed in water and the paper fibers sheared (pulped). A sheet of paper was made from the pulped fibers and visually examined for adhesive dots (stickies). An absence of dots indicates that the adhesive composition is repulpable.

TABLE 2

Repulpable Polymer Blends

| Example No. | Repulpable Copolymer, % | Non-Repulpable Copolymer, % | Other Components | Repulpability |
|---|---|---|---|---|
| 8 | Ex. 1 | A | 49:51 | Good |
| 9 | Ex. 1 | A | 52:48 | Good |
| 10 | Ex. 1 | A | 49:51 | Good |
| 11 | Ex. 6 | A | 49:51 | Good |
| 12 | Ex. 1 | B | 57:43 | Good |
| 13 | Ex. 1 | C | 61:39 | Good |

[1]Repulpable: Non-repulpable copolymer weight ratio, on a dry weight basis.

Adhesive Performance of Blends of Copolymers

Adhesive performance data (shear, 90° peel, and loop tack) for the polymer blends of Examples 8–10, 12 and 13 are presented in Table 4, along with data for the repulpable copolymer of Example 1, for comparison. In each case, test samples were prepared by coating an adhesive sample on a release paper with a bull nose coater and drying the adhesive for 15 minutes at 70° C. Each coating was applied in sufficient quantity to obtain a dry coat weight of about 20±2 g/m². The coated sample was allowed to equilibrate to ambient conditions and then laminated to a DSX paper (Ex. 8, 12 and 13) or vellum (Ex. 9 and 10) facestock. The laminate constructions were conditioned for at least 8 hours at 23° C. and 50% relative humidity before adhesive testing.

Shear strength is a measure of the cohesiveness or internal strength of the adhesive. Shear was determined in accordance with Pressure-Sensitive Tape Council test method, PSTC #7 (6th edition). The overlap dimensions were ½"×½", with a static load of 500 g. The test was conducted at room temperature at a 20 ft/min draw rate.

90° peel is a measure of the force required to remove an adhesive coated flexible facestock from a substrate after a specified period of dwell, at a 90° angle. It was determined in accordance with PSTC test #1 (6th edition). The dwell time was 20 minutes and the pull rate was 20 m/min.

Loop tack is a measure of the force required to remove a loop of adhesive-coated facestock from a test substrate after a very short dwell and no external pressure. Loop tack was determined in accordance with PSTC test #5 (6th edition).

TABLE 3

Adhesive Performance[1] of PSA Compositions

| Example | Shear (min) | 90° Peel (N/m), (lb/in) | | | | Loop tack (N/m), (lb/in) | | | |
|---|---|---|---|---|---|---|---|---|---|
| | | S.S. | HDPE | Glass | R.C. | S.S. | HDPE | Glass | R.C. |
| 1 | 02 | 823 | 333 | 753 | 525 | 595 | 438 | 893 | 385 |
| | | 4.7 | 1.9 | 4.3 | 3.0 | 3.4 | 2.5 | 5.1 | 2.2 |
| | | (Pt/c) | (P) | (Pt/c) | (Fp) | (Lps) | (P) | (Lps) | (P) |
| 8 | 38 | — | — | — | 259 | — | 213 | — | 184 |
| | | — | — | — | 1.5 | — | 1.2 | — | 1.1 |
| | | (Pt) | (Pt) | (Pt) | (Lfp) | (Pt) | (P) | (Pt) | (P) |
| 9 | 24 | — | — | — | 263 | 560 | 193 | 560 | 175 |
| | | — | — | — | 1.5 | 3.2 | 1.1 | 3.2 | 1.0 |
| | | (Pt) | (Pt) | (Pt) | (Fp) | (P) | (P) | (P) | (P) |
| 10 | 38 | — | — | — | 228 | 525 | 280 | 560 | 158 |
| | | — | — | — | 1.3 | 3.0 | 1.6 | 3.2 | 0.9 |
| | | (Pt) | (Pt) | (Pt) | (Fp) | (P) | (P) | (P) | (P) |
| 12 | 05 | — | 285 | — | 169 | 851 | 411 | — | 271 |
| | | — | 1.6 | — | 1.0 | 4.9 | 2.4 | — | 1.6 |
| | | (Pt) | (Z) | (Pt) | (Lfp) | (P) | (P) | (Pt) | (Lfp) |
| 13 | 14 | — | 159 | — | 154 | 698 | 242 | — | 177 |
| | | — | 0.9 | — | 0.9 | 4.0 | 1.4 | — | 1.0 |
| | | (Pt) | (Z) | (Pt) | (Lfp) | (P) | (Z) | (Pt) | (Lfp) |

[1]Peel and loop tack values are given in metric (upper entry) and English (lower entry) units. Failure modes are given in parentheses. No numerical value is given in the case of a paper tear (Pt).

As indicated in Table 3, PSA compositions prepared as blends of a repulpable andnonrepulpable emulsion acrylic copolymer exhibited much higher shear values than the stand-alone repulpable copolymer of Example 1. 90° peel values were good, though not as high as Example 1. Loop tack values were comparable. The results indicate that the new PSA compositions of the present invention can be used in repulpable, gpp or removable, repositionable label applications and other applications.

The invention has been described in preferred and exemplary embodiments and aspects, but is not limited thereto. Persons skilled in the art will appreciate that other modifications and applications fall within the scope of the invention. For example, it will be appreciated that, because the repulpable, emulsion acrylic copolymers described herein are inherently tacky, they can be used as adhesion promoters—tackifiers—by blending the copolymers into other PSAs in need of tackification. They also can be used as bulk flow agents, to prevent edge ooze in adhesive constructions, such as labels. The quantity of repulpable, emulsion acrylic copolymer used depends on the amount of tackification or bulk flow control desired. Thus, the present invention further includes a method of tackifying or promoting adhesion of an existing PSA by blending into the PSA a sufficient quantity of a repulpable, emulsion acrylic copolymer as described herein.

Similarly, the present invention also provides a method of making a PSA repulpable, by blending into the PSA a sufficient quantity of a repulpable, emulsion acrylic copolymer as described herein. Generally, this may require a dry weight blending ratio of at least about 16:84 (repulpable:non-repulpable copolymers) as described above.

All references cited herein are incorporated by reference. As used in the text and the claims, the term "about," when used in connection with a range of values, modifies both the low and high value stated.

What is claimed is:

1. A repulpable composition, comprising:
   a blend of (a) a repulpable, emulsion acrylic copolymer formed by sequential polymerization, and (b) a non-repulpable, emulsion acrylic copolymer comprising at least one of a vinyl ester and a styrenic monomer, said blend having an (a):(b) weight ratio of from about 70:30 to 40:60, on a dry weight basis;
   wherein repulpability is determined according to TAPPI UM 213.

2. A repulpable PSA composition as recited in claim 1, wherein the non-repulpable, emulsion acrylic copolymer is formed by sequential polymerization.

3. A repulpable PSA composition as recited in claim 1, having an (a):(b) weight ratio of from about 70:30 to 40:60, on a dry weight basis.

4. A repulpable PSA composition as recited in claim 1, having an (a):(b) weight ratio of from about 55:45 to 45:55, on a dry weight basis.

5. A repulpable PSA composition as recited in claim 1, wherein the repulpable acrylic copolymer is formed from a plurality of monomers including at least one alkyl acrylate, at least one vinyl ester or styrenic monomer, at least one $C_3$ to $C_5$ polymerizable carboxylic acid, and at least one alkyl methacrylate.

6. A repulpable PSA composition as recited in claim 5, wherein the at least one alkyl acrylate is selected from the group consisting of methyl acrylate, ethyl acrylate, propyl acrylate, butyl acrylate, 2-ethylhexyl acrylate, isooctyl acrylate, isodecyl acrylate, and di(2-ethylhexyl) maleate.

7. A repulpable PSA composition as recited in claim 5, wherein the at least one vinyl ester or styrenic monomer is selected from the group consisting of vinyl acetate, vinyl propionate, vinyl butyrate, vinyl isobutyrate, vinyl valerate, vinyl versitate, styrene, and α-methyl styrene.

8. A repulpable PSA composition as recited in claim 5, wherein the at least one $C_3$ to $C_5$ polymerizable carboxylic acid is selected from the group consisting of acrylic acid, methacrylic acid, and itaconic acid.

9. A repulpable PSA composition as recited in claim 5, wherein the at least one alkyl methacrylate is selected from the group consisting of methyl methacrylate, ethyl methacrylate, and butyl methacrylate.

10. A repulpable PSA composition as recited in claim 1, wherein the non-repulpable acrylic copolymer is formed from a plurality of monomers including at least one alkyl acrylate, at least one vinyl ester or styrenic monomer, at least one $C_3$ to $C_5$ polymerizable carboxylic acid, and at least one alkyl methacrylate.

11. A repulpable PSA composition as recited in claim 1, wherein each of the repulpable acrylic copolymer and non-repulpable acrylic copolymer are formed from a plurality of monomers including at least one alkyl acrylate, at least one vinyl ester or styrenic monomer, at least one $C_3$ to $C_5$ polymerizable carboxylic acid, and at least one alkyl methacrylate.

12. A repulpable PSA composition as recited in claim 1, containing a surfactant system comprising two or more surfactants selected from the group consisting of noinionic, anionic, and cationic surfactants.

13. A repulpable PSA composition as recited in claim 1, wherein the repulpable emulsion acrylic copolymer is formed in the presence of one or more nonionic surfactants, anionic surfactants, or a mixture thereof.

14. A repulpable PSA composition as recited in claim 1, wherein the repulpable, emulsion acrylic copolymer is formed in the presence of sodium alkyl allyl sulfosuccinate and sodium nonylphenol ethoxylated sulfate surfactants.

15. A repulpable PSA composition as recited in claim 1, wherein the non-repulpable, emulsion acrylic copolymer is formed in the presence of two or more nonionic and/or anionic surfactants.

16. A repulpable PSA composition as recited in claim 1, wherein the non-repulpable, emulsion, acrylic copolymer is formed in the presence of sodium lauryl sulfate ether and sodium dioctyl sulfosuccinate surfactants.

17. A repulpable PSA composition as recited in claim 1, wherein both the repulpable and non-repulpable emulsion acrylic copolymers are formed in the presence of one or more non-APE surfactants.

18. An inherently tacky adhesive, comprising:
   a dried coating of the PSA composition of claim 1.

19. An adhesive as recited in claim 18, wherein the coating is adhered to a paper, polymer, foil, or corrugated board facestock.

20. A repulpable PSA composition, comprising:
   a blend of
     (a) a repulpable, emulsion acrylic copolymer formed by sequential polymerization of a plurality of monomers, comprising, on a parts by weight basis, based on the total weight of monomers forming the copolymer, (i) about 50 to 70 parts of at least one alkyl acrylate having about 4 to 12 carbon atoms in the alkyl group, (ii), about 10 to 20 parts of at least one vinyl ester or styrenic monomer, (iii) about 6 to 20 parts of at least one $C_3$ to $C_5$ polymerizable carboxylic acid, and (iv) about 5 to 15 parts of at least one alkyl acrylate having 1 to 3 carbon atoms in the alkyl group, and/or at least one alkyl methacrylate having 1 to 4 carbon atoms in the alkyl group, and
     (b) a non-repulpable, acrylic copolymer comprising at least one of a vinyl ester and a styrenic monomer;
   wherein the ratio of (a):(b) is from 70:30 to 40:60, on a dry weight basis and further wherein repulpability is determined according to TAPPI UM 213.

21. A repulpable PSA composition as recited in claim 20, wherein the plurality of monomers forming the repulpable, emulsion acrylic copolymer comprises 2-ethylhexyl acrylate, vinyl acetate, methyl acrylate, acrylic acid, and methacrylic acid.

22. A repulpable PSA composition as recited in claim 20, wherein the (a):(b) weight ratio is from about 55:45 to 45:55, on a dry weight basis.

23. A PSA construction, comprising:
   (a) a blend of emulsion polymers, forming a PSA composition, the blend comprising (i) a repulpable, acrylic copolymer formed by sequential polymerization of a plurality of monomers in the presence of at least one surfactant, and (ii) a non-repulpable, acrylic copolymer formed by sequential polymerization of a plurality of monomers comprising at least one of a vinyl ester and a styrenic monomer in the presence of two or more surfactants, wherein repulpability is determined according to TAPPI UM 213; and
   (b) a facestock coated with the PSA composition.

24. A PSA construction as recited in claim 23, further comprising a removable release liner protecting the PSA composition.

25. A PSA composition as recited in claim 23, wherein the facestock is a paper, corrugated board, polymeric film, or foil.

26. A PSA construction as recited in claim 23, wherein the facestock is a repulpable paper.

27. A PSA construction as recited in claim 23, wherein the ratio of (a):(b) is from 72:28 to 16:84, on a dry weight basis.

28. A PSA construction as recited in claim 23, wherein the ratio of (a):(b) is from 70:30 to 40:60, on a dry weight basis.

29. A PSA construction as recited in claim 23, wherein the ratio of (a):(b) is from 55:45 to 45:55, on a dry weight basis.

30. A method for making a non-repulpable emulsion acrylic PSA composition repulpable, comprising:

blending (a) a repulpable, emulsion acrylic copolymer formed by sequential polymerization of a plurality of monomers comprising on a parts by weight basis, based on the total weight of monomers forming the copolymer, (i) about 50 to 70 parts of at least one alkyl acrylate having about 4 to 12 carbon atoms in the allyl group, (ii) about 10 to 20 parts of at least one vinyl ester or styrenic monomer, (iii) about 6 to 20 parts of at least one $C_3$ to $C_5$ polymerizable carboxylic acid, and (iv) about 5 to 15 parts of at least one alkyl acrylate having 1 to 3 carbon atoms in the alkyl group, and/or at least on alkyl methacrylate having 1 to 4 carbon atoms in the alkyl group, with (b) the non-repulpable emulsion acrylic PSA composition comprising at least one of a vinyl ester and a styrenic monomer, the weight ratio of (a):(b) is from about 70:30 to 40:60, on a dry weight basis;

wherein repulpability is determined according to TAPPI UM 213.

* * * * *

UNITED STATES PATENT AND TRADEMARK OFFICE
CERTIFICATE OF CORRECTION

PATENT NO. : 6,136,903
DATED : October 24, 2000
INVENTOR(S) : Shiaonung Su, Paul Keller and Graham Yeadon It is certified that error appears in the above-identified patent and that said Letters Patent is hereby corrected as shown below:

<u>Column 20,</u>
Line 16, replace "noinionic" with -- nonionic --.
Line 31, replace "sodium lauryl sulfate ether" with -- sodium lauryl ether sulfate --.

<u>Column 22,</u>
Line 18, replace "on alkyl" with -- one alkyl --.

Signed and Sealed this

Eighteenth Day of June, 2002

*Attest:*

JAMES E. ROGAN
*Attesting Officer*     *Director of the United States Patent and Trademark Office*